(12) United States Patent
Roush et al.

(10) Patent No.: US 7,734,909 B1
(45) Date of Patent: Jun. 8, 2010

(54) USING VOICE OVER IP OR INSTANT MESSAGING TO CONNECT TO CUSTOMER PRODUCTS

(75) Inventors: Charles Steven Roush, Boulder, CO (US); Ramona Lynn Roush, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1318 days.

(21) Appl. No.: 10/675,719

(22) Filed: Sep. 29, 2003

(51) Int. Cl.
*H04L 29/06* (2006.01)

(52) U.S. Cl. .......................... 713/154; 713/155; 726/3; 726/11; 709/203; 709/223

(58) Field of Classification Search .................... 726/2, 726/22, 26, 3, 5, 11, 14, 27, 34
See application file for complete search history.

(56) References Cited

U.S. PATENT DOCUMENTS

| | | | | |
|---|---|---|---|---|
| 6,449,344 | B1 | 9/2002 | Goldfinger et al. | 379/88.17 |
| 7,027,463 | B2 * | 4/2006 | Mathew et al. | 370/463 |
| 7,073,055 | B1 * | 7/2006 | Freed et al. | 713/155 |
| 2002/0032766 | A1 * | 3/2002 | Xu | 709/223 |
| 2002/0038339 | A1 * | 3/2002 | Xu | 709/203 |
| 2003/0093563 | A1 * | 5/2003 | Young et al. | 709/245 |
| 2003/0161297 | A1 * | 8/2003 | Noda et al. | 370/352 |
| 2005/0105510 | A1 * | 5/2005 | Reding et al. | 370/352 |
| 2005/0216757 | A1 * | 9/2005 | Gardner | 713/194 |
| 2006/0026288 | A1 * | 2/2006 | Acharya et al. | 709/227 |

FOREIGN PATENT DOCUMENTS

WO WO 00/78008 A1 12/2000

OTHER PUBLICATIONS

Network World, Inc., "Taking the voice over IP plunge," 2003 (12 pages).
Sjoberg, J., et al., "Real-Time Transport Protocol (RTP) Payload Format and File Storage Format for the Adaptive Multi-Rate (AMR) and Adaptive Multi-Rate Wideband (AMR-WB) Audio Codecs," The Network Society, 2002, available at http://rfc.sunsite.dk/rfc/3267.html, dated Jun. 2002, downloaded May 23, 2003 (50 pages).
Schulzrinne, H., et al., "RTP: A Transport Protocol for Real-Time Applications," available at http://www.iptel.org/info/players/ietf/media/rfc1889.txt, dated Jan. 1996, downloaded May 23, 2003 (66 pages).
Vamosi, Robert, "The next hacker target: instant messaging," ZDNET Reviews, May 30, 2003, available at http://zdnet.com.com/2100-1107-928415.html, downloaded May 23, 2003 (3 pages).

(Continued)

*Primary Examiner*—Pramila Parthasarathy
(74) *Attorney, Agent, or Firm*—Sheridan Ross P.C.

(57) ABSTRACT

A system for remotely servicing a computational component is provided that includes:
(a) a firewall 112;
(b) a computational component 104 requiring servicing, the firewall 112 analyzing communications to the computational component 104;
(c) a data collection agent 116 operable to (i) establish a session with a servicing computational component 100, packets of the session being analyzed by the firewall 112 and the session being of a type permitted by the firewall 112, (ii) receive a packet associated with the session, the packet comprising a machine executable servicing command for the computational component 104, and (iii) forward the servicing command to the computational component 104.

49 Claims, 3 Drawing Sheets

OTHER PUBLICATIONS

Smith, Spencer, "Be Aware of Security Issues with ICQ Instant Messaging," Computing News, Spring 2000, available at http://cc.uoregon.edu/cnews/spring2000/icq.html, downloaded May 23, 2003 (5 pages).

Internet Security Systems, Inc., "Risk Exposure Through Instant Messaging and Peer-To-Peer (P2P) Networks," Apr. 2002 (27 pages).

Huuhtanen, J., "Real-Time Streaming Protocol (RTSP)," available at http://www.tcm.hut.fi/Studies/Tik-110.300/1998/Essays/rtsp.html, dated Nov. 22, 1998, download May 23, 2003 (7 pages).

Jabber, Inc., "The Instant Messaging Standards Race: Comparing XMPP/Jabber and SIP/SIMPLE," Version 1.0, May 2003 (11 pages).

Millard, Peter, "A protocol which allows two jabber endpoints to negotiate feature options between themselves," Jabber Enhancement Proposal No. 0020, Jabber Software Foundation, available at http://www.jabber.org/jeps/jep-0020.html, downloaded May 22, 2003 (15 pages).

Millard, Peter, "A protocol for managing server-side blacklist and whitelist rules," Jabber Enhancement Proposal No. 0016, Jabber Software Foundation, available at http://www.jabber.org/jeps/jep-0016.html, downloaded May 22, 2003 (7 pages).

Miller, Matthew, "A protocol for reporting and executing ad-hoc, human-oriented commands in Jabber," Jabber Enhancement Proposal No. 0050, Jabber Software Foundation, available at http://www.jabber.org/jeps/jep-0050.html, downloaded May 22, 2003 (16 pages).

Saint-Andre, Peter, "A robust protocol for text-based conferencing in Jabber," Jabber Enhancement Proposal No. 0045, Jabber Software Foundation, available at http://www.jabber.org/jeps/jep-0045.html, downloaded May 22, 2003 (82 pages).

Miller, Jeremie, et al., "Jabber protocol elements can be given an expiry date/time, a "use-by" timestamp, by attaching to it an <x/> extension qualified by the jabber:x:expire namespace," Jabber Enhancement Proposal No. 0023, Jabber Software Foundation, available at http://www.jabber.org/jeps/jep-0023.html, downloaded May 22, 2003 (4 pages).

Hildebranen, Joe, et al., "Allow access to a Jabber server from behind firewalls which do not allow outgoing sockets on port 5222, via HTTP requests," Jabber Enhancement Proposal No. 0025, available at http://www.jabber.org/jeps/jep-0025.html, downloaded May 22, 2003 (7 pages).

Jabber Software Foundation, "Jabber::Protocol—Delayed Delivery," available at http://www.jabber.org/protocol/delay.html, downloaded May 22, 2003 (3 pages).

Jabber Software Foundation, "Jabber:: Protocol—How File Transfer Works," available at http://www.jabber.org/protocol/filetransfer.html, downloaded May 22, 2003 (3 pages).

Jabber Software Foundation, "Jabber::Protocol—Presence Subscriptions," available at http://www.jabber.org/protocol/subscriptions.html, downloaded May 22, 2003 (15 pages).

Jabber Software Foundation, "Jabber:: Protocol—Authentication," available at http://www.jabber.org/protocol/authentication.html, downloaded May 22, 2003 (1 page).

Jabber Software Foundation, "Jabber:: Protocol—Core Data Elements," available at http://www.jabber.org/protocol/coredata.html, downloaded May 22, 2003 (7 pages).

Jabber Software Foundation, "Jabber:: Protocol—XML Streams," available at http://www.jabber.org/protocol/xmlstreams.html, downloaded May 22, 2003 (6 pages).

Jabber Software Foundation, "Jabber::Protocol—Groupchat," available at http://www.jabber.org/protocol/groupchat.html, downloaded May 22, 2003 (4 pages).

Tyson, Jeff, "Introduction to How Instant Messaging Works," HowStuffWorks, Inc., available at wysiwyg://65/http://www.howstuffworks.com/instant-messaging.htm, downloaded May 22, 2003 (3 pages).

ViewZ, "Instant Messaging Guide—ICQ (I Seek You)," available at http://www.viewz.com/features/imguide2.shtml, downloaded May 23, 2003 (3 pages).

Ridgway, Neil, "The Real-time Transport Protocol (RTP)," Sep. 7, 1998, available at http://www.mmrg.ecs.soton.ac.uk/publications/archive/ridgway1998/html/node23.html, downloaded May 23, 2003 (2 pages).

Ridgway, Neil, "The Real Time Streaming Protocol (RTSP)," Sep. 7, 1998, available at http://www.mmrg.ecs.soton.ac.uk/publications/archive/ridgway1998/html/node29.html, downloaded May 23, 2003 (2 pages).

Cherry, Steven, "IM Means Business," IEEE Spectrum, Nov. 2002, pp. 28-32.

* cited by examiner

US 7,734,909 B1

USING VOICE OVER IP OR INSTANT MESSAGING TO CONNECT TO CUSTOMER PRODUCTS

FIELD OF THE INVENTION

The present invention relates generally to servicing of customer products and specifically to remote servicing of customer products via a communications or data processing network.

BACKGROUND OF THE INVENTION

Network security is rapidly becoming a crucial task for network administrators. Successful and unsuccessful incidents of hacking worldwide are rising in frequency each year. To combat hacking, firewalls have been developed. A firewall is a gateway (either software and/or hardware) that sits between two networks, buffering and scrutinizing data traffic to prevent malicious hackers from gaining access to computational components in one of the networks. Commonly, one of the networks is the Internet and the other network is a Local Area Network or LAN.

There are five generally accepted types of firewalls used on Internet connections, namely frame-filtering firewalls, packet-filtering firewalls, circuit gateways, stateful and application gateways, and proxy servers. Frame-filtering firewalls filter, to the bit level, the layout and contents of a LAN frame (such as Ethernet/802.3, token ring/802.5, FDDI and others). By providing filtering at this level, frames that do not belong on the trusted network are rejected before they can reach any meaningful computational component, including the firewall itself. A packet-filtering firewall is commonly a router with packet-filtering capabilities or a dedicated device that performs packet-filtering. Circuit gateway firewalls typically monitor session set-up between a system and the user security options relative to that system for a particular user. For instance, a circuit gateway may check user IDs and passwords for a connection request. Other types of circuit firewalls might implement proxy connection authorization or other types of authorization services. Stateful firewalls are intended to combat IP spoofing, session hijacking, piggyback session acquisition, and other types of hacking attacks. A stateful firewall or stateful inspection facility is intelligent enough to watch all transactions between two systems, to understand enough of the details of how the protocol works to identify a specific condition in the transaction between two applications, to be able to predict what should transpire next in the transaction, and to be able to detect when normal operational "states" of the connection are being violated. In this type of firewall, the network security manager can specify rules and filters for specific technical transactions between the systems and applications and what to do if they are violated. Finally, application gateways or proxy firewalls provide protection at the application level. An application gateway firewall uses custom programs for each protected application. When a new application that requires protection is added to the network, a new program has to be written and added to the set of other programs that reside on the firewall. For example, if e-mail is to be protected, a custom e-mail application is written that includes specific security rules (e.g., what type of e-mail is permitted). These custom-written application programs act as both a client and server and effectively serve as proxies to the actual applications. When viewed from the perspective of functionality, an application gateway firewall is the opposite of a packet-filtering firewall, namely the former is application- or program-specific while the latter is general-purpose.

Firewalls have created numerous problems for remote servicing of computational components, such as PBXs and media servers. Internet-based connectivity by service personnel is hindered or even blocked completely by firewalls.

To circumvent the firewall connectivity problem, dial-up connectivity between a product and a service system has been widely implemented. Dial-up connectivity usually requires one dedicated POTS line per supported system plus modems on each end. Dial-up connectivity can be expensive due to the costs of servicing the modems and the ongoing cost of providing a dedicated POTS line. Dial-up connections are typically slow, leading to higher servicing costs. Moreover, dial-up systems commonly lack a high level of security. Hackers continue to attack modems selectively as the weak link in network security.

SUMMARY OF THE INVENTION

These and other needs are addressed by the various embodiments and configurations of the present invention. The present invention is directed to the remote performance of maintenance, diagnosis, repair, reconfiguring, provisioning, administering, monitoring, operating, and servicing of and other types of data collection (hereinafter collectively referred to as "servicing") from computational components in the presence of an intervening firewall. In a preferred configuration, such servicing communications are tunneled through firewalls by disguising the communications to resemble a desired type of session.

In a first embodiment, the present invention is directed to a method for remotely servicing a computational component, comprising:

(a) providing a firewall and a computational component requiring servicing, the firewall analyzing communications to the computational component;

(b) establishing a session with a servicing computational component, packets of the session being analyzed by the firewall and the session being of a type permitted by the firewall;

(c) receiving a packet associated with the session, the packet including a machine executable servicing command for the computational component requiring servicing; and (d) forwarding the servicing command to the computational component requiring servicing.

As used herein, a "servicing command" refers to any command or instruction associated with maintenance, diagnosis, provisioning, administration, monitoring, operating, repair, replacement, (re)configuring, and servicing of a computational component while a "servicing response" refers to a response from the computational component to the servicing command. When the computational component is a telecommunications switch, exemplary servicing commands include rebooting, activating/deactivating call processing parameters or features, resetting values of call processing parameters, user feature activation/deactivation, testing hardware, testing alarming, and retrieving data.

Call processing parameters or features that can be activated/deactivated and/or reset using the data collection agent include Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, wireless, logged-in automated call distribution or ACD agents, maximum currently registered IP stations, maximum administered IP trunks, offer category, maximum number of ports, maximum number of administered remote office trunks, maximum number of mobile stations, abbreviated dialing enhanced list, audible message waiting, vectoring, answer supervision by call classifier, ATM trunking, agent states, dial by name, DCS call coverage, echo cancellation, multifrequency signaling, wideband switching, logged-in agents, offer category, maximum numbers of concurrently registered IP stations, administered IP trunks, ports, and concurrently administered remote office stations/trunks, call center release, features that have a product value (e.g., corresponding to a product name or type), a release number (e.g., referring to a product release identifier), and numeric value(s) (e.g., indicating an operational parameter associated with the product and/or release, such as how many ports are licensed, how many licenses for the product are granted, how many concurrent users are allowed, and/or how many stations can be concurrently administered with the feature).

Any class of user features can be activated/deactivated by administration using the data collection agent, including (a) features that are invoked prior to placing a call, (b) features that are invoked during a call, (c) features that are non-call associated that do not require display interactions, (d) features that are non-call associated that require display interactions, (e) features that are operated against calls not associated with the activating station, and (f) features that are operated against an alerting call, classes (a), (b), and (c) are particularly useful for a user. Examples of such features include without limitation analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

The session is preferably a real-time or near real-time session and uses a point-to-point protocol. As used herein, by the sending party a real-time or near real-time session is a session in which the transmission delay between sending and receiving by the addressee is no more than about 5 seconds. Examples of real-time or near real-time sessions include instant messaging, and computer telephony sessions. "Computer telephony sessions" refer generally to any computer telephony session, including person-to-person communications, such as voice-over-IP or VoIP. The type of the session is not intended to be associated with a servicing command. In a typical configuration, the header and payload of the packets resemble the desired type of session with the payload containing the servicing commands/responses. Generally, voice or data messages, such as the graphical display instructions in an instant messaging application and the codec information in a VoIP application, are omitted from the packets. In the case of instant messaging, the instant messaging application would include the logic to implement the present invention as there may be no graphical display instructions in the packet.

The forwarding of the servicing command to the component requiring servicing command typically occurs at least substantially immediately after the reception of the servicing command. In most applications, the delay between receiving the servicing command and forwarding the command to the computational component requiring servicing is no more than about 5 seconds.

When the servicing response is (optionally) received from the component requiring servicing, the servicing response is configured as at least one packet associated with the session and forwarded to an administrative device. In this manner, the servicing command and response packets are exchanged back-and-forth between the administrative device and the computational component requiring servicing without undue delay by the firewall.

The methodology and architecture of the present invention can have a number of advantages. For example, the disguising of packets to resemble a firewall-acceptable type of session can minimize blockage by the firewall and expedite servicing. This can lead to reduced servicing costs and increased servicing convenience. Because these benefits can be implemented with appropriate authentication and encryption, the benefits can be realized without compromising network security. The problems associated with dial-up connectivity, namely the costs of servicing the modems and providing a dedicated POTS line, and the slow speed of dial-up connections, and the security issues related to modems, can be avoided. The present invention can be readily implemented with existing computational systems, with little modification or alteration to system components, including the firewall or virtual private network. The present invention can ride on top of existing networking infrastructures. For example, the present invention can utilize existing components, namely tunneling, encryption, authentication, and compression. Such components already exist as open source modules implementing standard protocols. Although the present invention may not replace all other product connect technologies, it can provide a low-cost option for small and medium sized customers with modest security standards.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
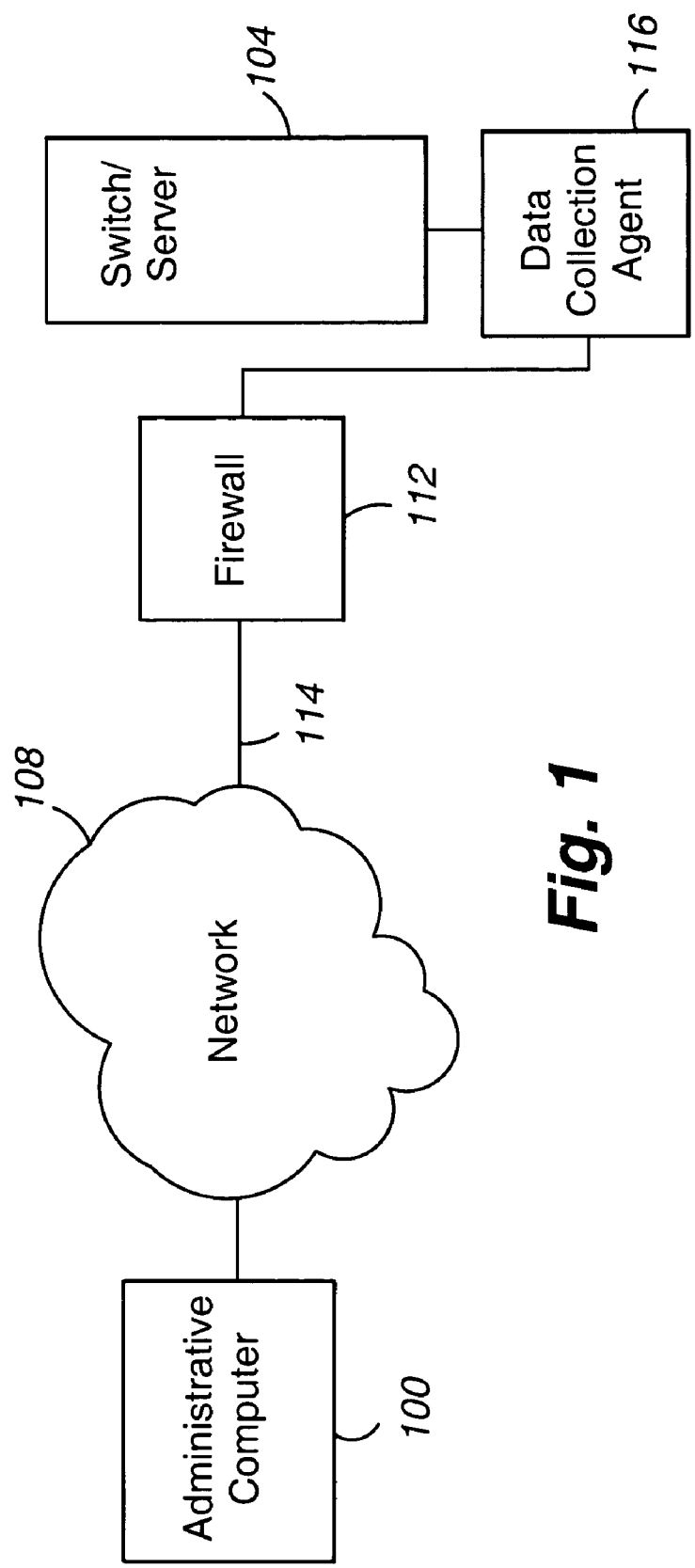
FIG. 1 depicts a computational architecture according to a first embodiment of the present invention.

Referring to FIG. 1, a first embodiment of the present invention will be discussed. The architecture includes an administrative computer 100 and switch/server 104 in communication with one another via network 108. A firewall 112 is positioned between the switch/server 104 and the network 108 to provide security for the switch/server. A data collection agent 116 is provided to facilitate communications between the administrative computer 100 and the switch/server 104 as discussed in detail below.

The administrative computer 100 can be any computational component capable of sending remote maintenance, diagnosis, repair, replacement, (re)configuring, servicing, or another type of data collection from the switch/server. It can be human-driven, autonomous, or nonautonomous. Typically, the administrative computer will be a server, personal computer, or a laptop computer. The administrative computer will typically be geographically dislocated from the switch/server. In most applications, the administrative computer is located at the physical facility of a service or maintenance provider.

The switch/server 104 can be any suitable telephony switch or media server or component thereof. The term "switch/server" as used herein should be understood to include a PBX, an enterprise switch, or other type of telecommunications system switch or server, as well as other types of processor-based personal computer, main frame computer, storage subsystem, industrial equipment, or household appliance devices such as media servers, computers, adjuncts, etc. In a typical configuration, the switch/server 104 includes a processor (not shown), a memory (not shown), a database (not shown), one or more interfaces (not shown), a switch fabric (not shown), and a set of service circuits (not shown). The processor may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

Illustratively, the switch/server 104 can be a modified form of the subscriber-premises equipment disclosed in U.S. Pat. Nos. 6,192,122; 6,173,053; 6,163,607; 5,982,873; 5,905,793; 5,828,747; and 5,206,903; Avaya Inc.'s Definity™ private-branch exchange (PBX)-based ACD system; Avaya Inc.'s MultiVantage™ PBX, or Avaya Inc.'s, S8300™ media server. Other types of known switches and servers are well known in the art and therefore not described in detail herein. The switch or media server 104 typically is a stored-program-controlled system. The switch/server 104 comprises a network interface card (not shown) to provide services to a plurality of communication device (not shown). Included in the memory is a contact controller (not shown) for handling incoming and outgoing contacts, and a media gateway for signal conversion from packet-switched to circuit-switched and vice versa. Exemplary media gateways include Avaya Inc.'s, G700 Media Gateway™ and may be implemented as hardware such as via an adjunct processor or chip in the switch/server.

The switch/server 104 is coupled via one or more communication lines 114 to the packet-switched network 108. In one configuration, the network is a distributed processing network, such as the Internet. The lines 114 carry incoming contacts from the network 108 to the data collection agent 116 for processing and carry outgoing contacts from the agent 116 to the network 108. The packet-switched network 108 can be any data and/or distributed processing network, such as the Internet. The network 108 typically includes proxies (not shown), registrars (not shown), and routers (not shown) for managing packet flows.

The firewall 112 can be any type of firewall, including frame-filtering firewalls, packet-filtering firewalls, circuit gateways, stateful and application gateways, and proxy servers.

The data collection agent 116 is configured to enable "tunneling" of product servicing connections (e.g., machine executable commands and instructions and responses) from the administrative computer 100 through the firewall 112. This is typically effected by disguising the connections as a set of communications passed by the firewall. The connections are addressed to the data collection agent 116 which then issues the connections (or servicing commands) to the switch/server 104. Upon receiving a servicing response, the data collection agent 116 generates response messages, also disguised as part of the set of communications, and sends the response messages to the administrative computer.

Although the set of communications can be any type of communication passed by the firewall, the set of communications preferably is configured as a real-time or near real-time communication session between two persons and is a point-to-point communication scheme. The operation will be exemplified using only two types of communications, namely instant messaging and voice-over-IP or VoIP. In either configuration, a session is initiated between the IP addresses of the administrative computer 100 and the data collection agent 116. The exchanged packets that are part of the session contain servicing commands issued by the administrative computer and servicing responses thereto provided by the data collection agent 116.

In instant messaging, the servicing commands from the administrative computer 100 are placed in the payload portion of the instant message in lieu of the normal instant message content intended for the human recipient. The header and trailer of the message otherwise resemble an instant message as defined by to a suitable instant messaging protocol to permit the exchanged communications between the administrative computer 100 and the data collection agent 116 to pass for an instant messaging session between two humans. Examples of suitable protocols include AOL Instant Messenger™, ICQ™, MSN Messenger™, Yahoo! Messenger™, Jabber™, Session Initiation Protocol/Instant Messaging and Presence Leveraging Extensions or SIMPLE, Extensible Messaging and Presence Protocol or XMPP, Sametime™, Everybody™, and Trillian™, and the Instant Messaging and Presence Protocol. These protocols normally use one of the Transmission Control Protocol and User Datagram Protocol for data transmission over the Internet. The embedded text of the command/response can be in any suitable form, such as ascii or a markup language.

As will be appreciated, instant messaging, in a normal application, enables near real-time text communications between two or more individuals. Instant messaging allows one to maintain a list of people, such as a buddy list or contact list, that one wishes to communicate with. In a typical application, sending an instant message opens up a small window where the receiver can type in messages that both the receiver and sender can view. A party is notified when one of the people on the list is on line and the contact information of the person is provided. The party's contact information is also forwarded to the people on the contact list that are signed on. To initiate a contact, a person clicks on the name of a person on the list that is on line and a window opens into which text can be entered. The person can then send an inputted message by clicking a send command. Typically, communication is directly between the two clients. The other person gets the message and responds. The window that each person views expands to include a scrolling dialog of the conversation.

When the conversation is completed, the message window is closed. When a person goes off line, the clients of each person on the list that are currently on line are notified that the person is now off line. The temporary file that contained the connection information, and typically the conversation itself, is deleted. Because instant messaging is a near real-time form of communication, most firewalls readily pass instant messages to avoid delays in the flow of communications.

In another example, the commands, instructions, and responses are disguised as VoIP communications. Like instant messaging, the command and/or instructions from the administrative computer 100 are placed in the payload portion of the VoIP packet in lieu of the normal digital audio stream. The header and trailer of the message otherwise resemble a VoIP packet as defined by a suitable VoIP protocol to permit the exchanged communications to imitate a VoIP session between the administrative computer 100 and the data collection agent 116. Examples of suitable protocols include the Real-Time (Transfer) Protocol or RTP, the Real Time Control Protocol or RTCP, and Real-Time Streaming Protocol or RTSP. The embedded text of the command/instruction/response can be in any suitable form, such as ascii or a markup language.

Because some VoIP protocols, such as RTP/Uniform Datagram Protocol or UDP, do not have the facility to enable checking to make sure all packets got to the destination (or request missing packet resend) and that those packets are in the correct order. It is therefore important to create a packet numbering and/or sequencing scheme to enable the data collection agent 116 to determine when all of the servicing command packets and the administrative computer to determine when all of the servicing response packets have been received and in what order they are to be sequenced or assembled.

Figure 2:
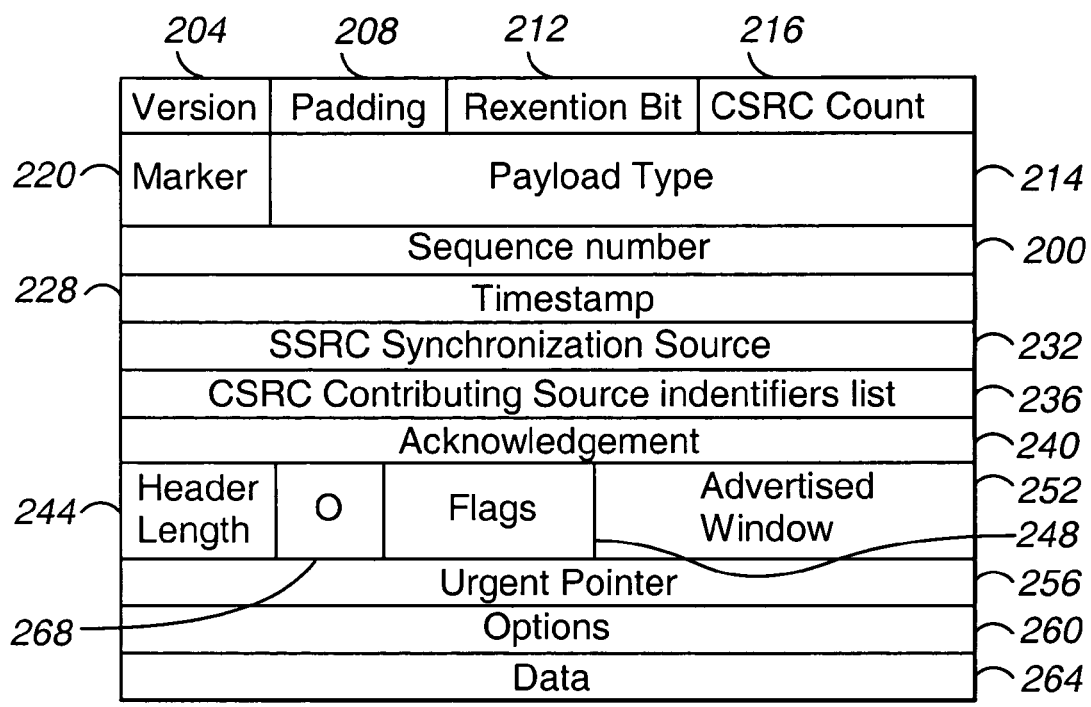
FIG. 2 depicts a modified packet structure based on the Real-Time Transport Protocol or RTP.

FIG. 2 illustrates a VoIP packet configuration to permit packet sequencing. In the depicted packet structure, fields of the Transfer Control Protocol are embedded within the RTP protocol data section. Some of the elements needed for TCP already exist in RTP and UDP so they do not need to be duplicated within the modified data section of the RTP packet. These fields include the Source Port (not shown), the Destination Port (not shown), and checksum (UDP) (not shown) and sequence number 200 (RTP). Other fields include version 204, padding 208, re-extension bit 212, CSRC count 216, marker 220, payload type 224, timestamp 228, SSRC synchronization source 232, and CSRC contributing source identifiers list 236. However, some fields need to be embedded in the data section of the RTP packet. These include acknowledgment 240, header length 244, flags 248, advertised window 252, urgent pointer 256, and options 260. The data 264 will take up the remainder of the space in the RTP data section. Some fields, such as "0" 268 are shown in FIG. 2 for completeness.

To disguise the packet for the firewall 112, the UDP fields, namely source port, destination port, length, and checksum and the RTP fields, namely version 204, padding 208, re-extension bit 212, CSRC count 216, marker 220, payload type 224, sequence number 200, timestamp 228, SSRC 232, and CSRC 236 are present and contain values that make the packet appear to be a VoIP packet. As will be appreciated, the source port represents the name of the application that sent the data in the packet, the destination port represents the name of the application that is to receive the data contained within the packet, sequence number represents the location of the packet in the packet sequence, the acknowledgment number 240 is used by the receiving computer to acknowledge which packets have successfully arrived (this number will be the sequence number of the next packet the receiver is ready to receive), header length 244 indicates the length of the header, flags 248 can contain three flags, namely reserved flag, don't fragment flag, and more fragments flag, advertised window 252 contains the value that indicates how many octets it can receive at once, checksum is responsible for ensuring that the entire packet arrived intact, urgent pointer 256 indicates where the urgent data is located, options 260 contains additional instructions not covered in other fields, and data 264 contains the servicing command/response.

In FIG. 1, the data collection agent 116 is configured as an adjunct processor connected to the switch/server. As will be appreciated, the data collection agent 116 can be configured as an internal component of the switch/server.

The invention is illustrated herein in conjunction with an exemplary communication system. Although well suited for use with, e.g., a system having a private branch exchange (PBX) or other similar contact processing switch, the invention is not limited to use with any particular type of communication system switch or configuration of system elements. Those skilled in the art will recognize that the disclosed techniques may be used in any remote servicing and/or maintenance applications involving computational components. In telecommunications systems, examples of components other than a telecommunications switch or media server that may be serviced include a voice mail server, a fax server, an e-mail server, telephone instrument and personal computer-based telecommunication software.

The operation of the data collection agent 116 will now be discussed with reference to FIGS. 3 and 4.

Figure 3:
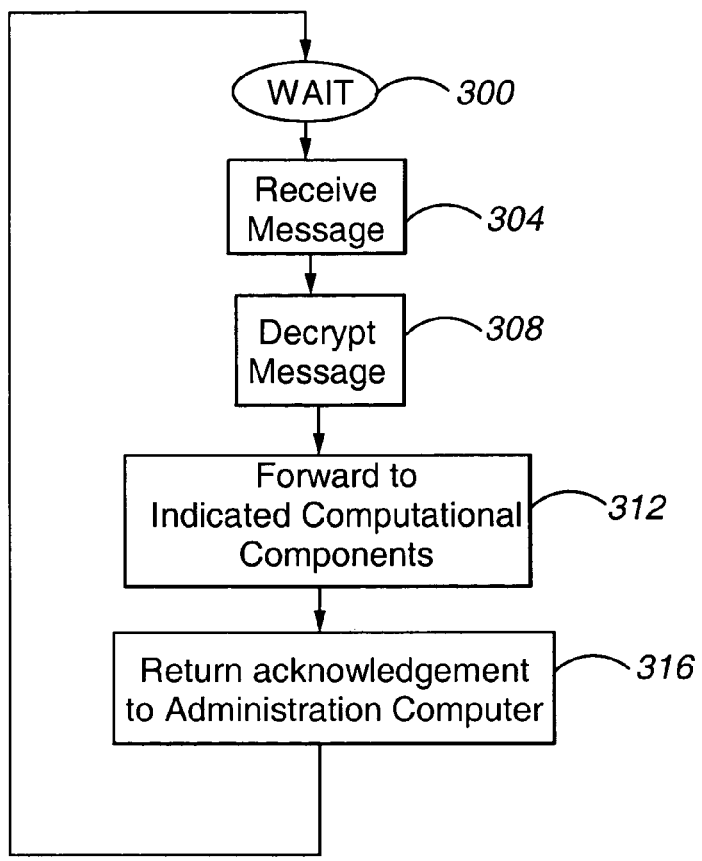
FIG. 3 depicts an operational embodiment of the data collection agent.

Referring to FIG. 3, the data collection agent 116 in step 300 waits for the arrival of an incoming message from the administrative computer 100. After the message is received in step 304, the agent 116, in step 308, decrypts the message and examines the payload of the message to identify servicing commands and a destination address of a computational component for same. As will be appreciated, the destination address can be omitted where there is only one computational component to receive the command such as the switch/server 104. The servicing command is executed on the identified computational component(s) in step 312. In step 316, the agent 116 optionally returns to the administrative computer 100 a packet containing the appropriate session headers and an acknowledgment that the command was received and acted upon.

Figure 4:
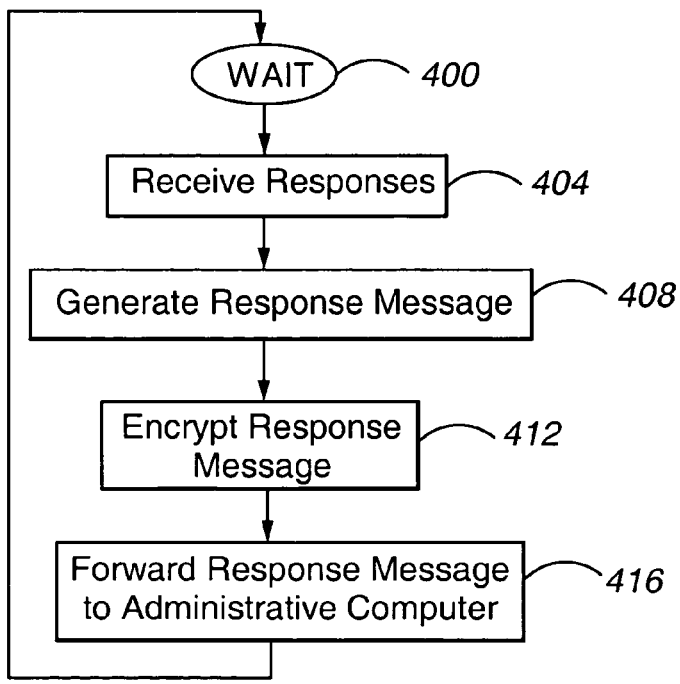
FIG. 4 depicts another operational embodiment of the data collection agent.

Referring now to FIG. 4, the agent 116 waits in step 400 for receipt of a servicing response from the computational component(s) to which the command/instruction was forwarded. After a servicing response is received in step 404, the agent 116 in step 408 generates a response message containing the servicing response. The message is encrypted in step 412 and forwarded to the administrative computer 100 in step 416. As in the case of the messages received from the administrative computer, the response message will contain appropriate session headers.

Encryption and authentication are readily accommodated by the architecture as the administrative computer and switch/server are typically under the control of or, in the case of the switch/server, were manufactured by a common entity. Thus, any suitable authentication techniques and encryption/decryption algorithms may be employed to provide for desired levels of network security.

In addition to the scenario of the agent waiting for the arrival of an incoming message, there are other scenarios where the agent initiates the session. For example, the agent can "call" the administrative computer and ask "do you have any instructions for me?" If so, the administrative computer sends the first instruction(s) to the agent and the scenario then plays out as described in steps 304, 308, 312, and 316 above. The agent can independently run a predetermined set of commands on the system to be serviced and then connect to the administrative computer and send the results, marked in such a way that it is clear what the command was. Finally, the agent can become aware that something noteworthy has happened on the system to be serviced (the system crashed, the system alarmed, a resource special was passed). The agent then calls the administrative computer, reports the noteworthy event, and then asks "do you have any instructions for me?" As noted previously, the steps 304, 308, 312 and 316 are subsequently performed.

A number of variations and modifications of the invention can be used. It would be possible to provide for some features of the invention without providing others.

For example in one alternative embodiment, the codec information is included within the VoIP packet used to disguise the machine executable command and/or response. The codec information, however, is not used. As noted, the codec information is normally excluded from the packet.

In yet another alternative embodiment, the packets exchanged between the administrative computer 100 and data collection agent 116 are configured as a live voice session other than a VoIP session.

In another alternative embodiment, the data collection agent may be configured in whole or part as a logic circuit, such as an Application Specific Integrated Circuit or as a software-controlled processor or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for remotely servicing a computational component, comprising:

providing a firewall and a computational component requiring servicing from a servicing entity responsible for servicing the computational component requiring servicing, the firewall analyzing packet communications to the computational component and being configured to block packets comprising servicing commands from the servicing entity;

establishing, through the firewall, a session with a servicing computational component, the servicing entity being associated with the servicing computational component, wherein packets of the session comprise servicing commands from the servicing entity and responses, from the computational component requiring servicing, to the servicing commands, wherein the incoming session packets are permitted to pass through the firewall, wherein the session packets are of a session-type otherwise permitted by the firewall and unrelated to servicing, by the servicing entity, of the computational component, and wherein the packets omit payload normally associated with packets of the session type;

receiving, by the firewall, an incoming packet associated with the session, the incoming packet comprising a machine executable servicing command from the servicing entity to be executed by the computational component requiring servicing, wherein the servicing command is in a payload portion of a voice-over-IP packet or a payload portion of an instant message packet;

receiving a servicing response to the servicing command from the computational component requiring servicing;

configuring the servicing response as at least one packet associated with the session; and sending, by the firewall, the at least one servicing response packet to the servicing computational component, forwarding, by the firewall, the servicing command to the computational component requiring servicing.

2. The method of claim 1, wherein the session is defined by a point-to-point protocol, wherein the session is a real-time or near real-time session, and wherein the servicing command is associated with at least one of maintenance, diagnosis, provisioning, administration, repair, replacement, and servicing of the computational component.

3. The method of claim 1, wherein the forwarding step occurs at least substantially immediately after the receiving step, wherein the session type is a computer telephony session, and wherein the session packets omit codec and voice information.

4. The method of claim 1, wherein the session is defined by a point-to-point protocol, wherein the session is configured as an instant messaging session, and wherein graphical display instructions are omitted from the incoming packet.

5. The method of claim 1, wherein the session is configured as a voice-over-IP session and wherein the session packets omit voice information.

6. The method of claim 1, wherein a packet header and trailer of the packet are configured as a voice-over-IP packet but the payload comprises text setting forth the machine executable servicing command.

7. The method of claim 1, wherein a packet header and trailer of the packet are configured as an instant message packet but the payload comprises the machine executable servicing command.

8. The method of claim 7, wherein the machine executable servicing command is not associated with operation of a graphical user interface or the display of information.

9. The method of claim 1, wherein the servicing command is associated with at least one of the following call processing parameters: Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, wireless, logged-in automated call distribution or ACD agents, maximum currently registered IP stations, maximum administered IP trunks, offer category, maximum number of ports, maximum number of administered remote office trunks, maximum number of mobile stations, abbreviated dialing enhanced list, audible message waiting, vectoring, answer supervision by call classifier, ATM trunking, agent states, dial by name, DCS call coverage, echo cancellation, multifrequency signaling, wideband switching, logged-in agents, offer category, maximum numbers of concurrently registered IP stations, administered IP trunks, ports, and concurrently administered remote office stations/trunks, call center release, features that have a product value (e.g., corresponding to a product name or type), a release number (e.g., referring to a product release identifier), and numeric value(s) (e.g., indicating an operational parameter associated with the product and/or release, such as how many ports are licensed, how many licenses for the product are granted, how many concurrent users are allowed, and/or how many stations can be concurrently administered with the feature).

10. The method of claim 1, wherein the servicing command is associated with at least one of the following user features: (a) features that are invoked prior to placing a call, (b) features that are invoked during a call, (c) features that are non-call associated that do not require display interactions, (d) features that are non-call associated that require display interactions, (e) features that are operated against calls not associated with the activating station, and (f) features that are operated against an alerting call.

11. The method of claim 10, wherein the servicing command is associated with at least one of the following user features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

12. The method of claim 1, wherein the session is point-to-point, wherein a header and trailer of the session packets resemble the session type permitted by the firewall, and wherein the servicing commands and responses are embedded in session packet payloads in lieu of message content intended for a human recipient.

13. The method of claim 1, wherein the type of the session is not intended to be associated with a servicing command, wherein the session type does not enable packet numerical sequencing, and wherein the session packets are altered to numerically sequence the packets.

14. The method of claim 1, wherein the servicing computational component is positioned logically external to a network segment protected by the firewall, wherein the computational component requiring servicing is positioned logically in the network segment protected by the firewall.

15. The method of claim 13, wherein the type of session is intended for person-to-person communications.

16. A computer readable storage medium comprising computer executable instructions, that when executed, cause a computer to perform the steps of claim 1.

17. A logic circuit comprising circuitry operable to perform the steps of claim 1 and transform an electronic servicing command into an operation by the computational component requiring servicing.

18. A system for remotely servicing a computational component, comprising:
a firewall operable to analyze incoming communications to a computational component requiring servicing and block servicing commands from the servicing entity responsible for servicing the computational component requiring servicing and transmitted by a servicing computational component;
a data collection agent operable to (a) establish, through the firewall, a session with the servicing computational component, packets of the session comprising servicing commands from the servicing entity and corresponding responses by the computational component requiring servicing, wherein the session packets are of a session type otherwise permitted by the firewall but unrelated to servicing of the computational component requiring servicing, and wherein the packets omit payload normally associated with packets of the session type, (b) receive, through the firewall, an incoming packet associated with the session, the incoming packet comprising a machine executable servicing command from the servicing entity for the computational component requiring servicing, wherein the servicing command is in a payload portion of a voice-over-IP packet or a payload portion of an instant message packet; (c) receive a servicing response to the servicing command from the computational component requiring servicing; (d) configure the servicing response as at least one packet associated with the session; (e) send, by the firewall, the at least one servicing response packet to an administrative device, and (f) forward the servicing command to the computational component requiring servicing.

19. The system of claim 18, wherein the session is defined by a point-to-point protocol, wherein the exchange of messages between the agent and the servicing computational component is a real-time or near real-time and wherein the servicing command is associated with at least one of maintenance, diagnosis, provisioning, administration, monitoring, operating, repair, replacement, configuring, reconfiguring, and servicing of the computational component.

20. The system of claim 18, wherein the forwarding function occurs at least substantially immediately after the receiving step and the session type is a computer telephony session and wherein the session packets omit codec and voice information.

21. The system of claim 18, wherein the session is configured as an instant messaging session and wherein the session packets omit messages intended for human recipients.

22. The system of claim 18, wherein the session is configured as a voice-over-IP session and wherein voice and data messages are omitted from the incoming packet.

23. The system of claim 18, wherein a packet header and trailer of the incoming packet are configured as a voice-over-IP packet but the payload comprises text setting forth the machine executable servicing command.

24. The system of claim 18, wherein a packet header and trailer of the incoming packet are configured as an instant message packet but the payload comprises the machine executable servicing command.

25. The system of claim 24, wherein the machine executable servicing command is not associated with operation of a graphical user interface or the display of information and wherein the session packets exclude graphical display instructions.

26. The system of claim 18, wherein the servicing command is associated with at least one of the following call processing parameters: Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, wireless, logged-in automated call distribution or ACD agents, maximum currently registered IP stations, maximum administered IP trunks, offer category, maximum number of ports, maximum number of administered remote office trunks, maximum number of mobile stations, abbreviated dialing enhanced list, audible message waiting, vectoring, answer supervision by call classifier, ATM trunking, agent states, dial by name, DCS call coverage, echo cancellation, multifrequency signaling, wideband switching, logged-in agents, offer category, maximum numbers of concurrently registered IP stations, administered IP trunks, ports, and concurrently administered remote office stations/trunks, call center release, features that have a product value (e.g., corresponding to a product name or type), a release number (e.g., referring to, a product release identifier), and numeric value(s) (e.g., indicating an operational parameter associated with the product and/or release, such as how many ports are licensed, how many licenses for the product are granted, how many concurrent users are allowed, and/or how many stations can be concurrently administered with the feature).

27. The system of claim 18, wherein the servicing command is associated with at least one of the following user features: (a) features that are invoked prior to placing a call, (b) features that are invoked during a call, (c) features that are non-call associated that do not require display interactions, (d) features that are non-call associated that require display interactions, (e) features that are operated against calls not associated with the activating station, and (f) features that are operated against an alerting call.

28. The system of claim 27, wherein the servicing command is associated with at least one of the following user features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

29. The system of claim 18, wherein the session is point-to-point, wherein a header and trailer of the session packets resemble the session type permitted by the firewall, and wherein the servicing commands and responses are embedded in session packet payloads in lieu of message content intended for a human recipient.

30. The system of claim 18, wherein the type of the session is not intended to be associated with a servicing command, wherein the session type does not enable packet numerical sequencing, and wherein the session packets are altered to numerically sequence the packets.

31. The system of claim 18, wherein the servicing computational component is positioned logically external to a network segment protected by the firewall, wherein the computational component requiring servicing is positioned logically in the network segment protected by the firewall.

32. The system of claim 30, wherein the type of session is intended for person-to-person communications.

33. A method for remotely servicing a computational component, comprising:

providing a firewall and a computational component requiring servicing, the firewall analyzing communications to the computational component requiring servicing and being configured to block servicing commands received from a servicing computational component, the servicing computational component being located logically outside a network segment protected by the firewall and being associated with a servicing entity responsible for servicing components located logically in the network segment, wherein the computational component requiring servicing is positioned logically in the network segment protected by the firewall;

establishing, through the firewall, a session with the servicing entity via the servicing computational component, packets of the session comprising servicing commands from the servicing entity and corresponding responses from the computational component requiring servicing, with the incoming packets being permitted to pass through the firewall, wherein the session is of a session type otherwise permitted by the firewall and unrelated to servicing, by the servicing entity, of the computational component requiring servicing, wherein the type of session is intended for person-to-person communications, and wherein the session packets exclude message content intended for a human recipient;

sending, by the firewall, a servicing command received in one or more packets associated with the session to the computational component requiring servicing, each of the one or more packets comprising at least part of a machine executable servicing command from the servicing entity for the computational component requiring servicing, wherein the servicing command is in a payload portion of a voice-over-IP packet or a payload portion of an instant message packet;

receiving, from the computational component requiring servicing, a servicing response to the servicing command;

configuring the servicing response as a packet associated with the session; and forwarding, by the firewall, the servicing response packet to the servicing computational component.

34. The method of claim 33, wherein the session is a real-time or near real-time session, wherein a header and trailer of the session packets resemble the session type permitted by the firewall, and wherein the servicing commands and responses are embedded in session packet payloads in lieu of message content intended for a human recipient.

35. The method of claim 33, wherein the forwarding step occurs at least substantially immediately after the receiving step.

36. The method of claim 33, wherein the session is configured as an instant messaging session and wherein the session packets omit both graphical user display instructions and message content for a human recipient.

37. The method of claim 33, wherein the session is configured as a voice-over-IP session and wherein the packet header comprises fields for source port, destination port, length, version, padding, re-extension bit, count, marker, payload type, sequence number, and timestamp, each containing a value associated with a packet in a voice-over-IP session.

38. The method of claim 33, wherein packet headers and trailers of the one or more packets are configured as a computer telephony packet but the payload comprises text setting forth the machine executable servicing command in lieu of a voice communication from a human sender for a human recipient.

39. The method of claim 33, wherein packet headers and trailers of the one or more packets are configured as an instant message packet but the payload comprises text setting forth the machine executable servicing command and omits graphical display instructions and a text communication from a human sender for a human recipient.

40. The method of claim 39, wherein the machine executable servicing command is not associated with operation of a graphical user interface or the display of information.

41. The method of claim 33, wherein the servicing command is associated with at least one of the following call processing parameters: Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, wireless, logged-in automated call distribution or ACD agents, maximum currently registered IP stations, maximum administered IP trunks, offer category, maximum number of ports, maximum number of administered remote office trunks, maximum number of mobile stations, abbreviated dialing enhanced list, audible message waiting, vectoring, answer supervision by call classifier, ATM trunking, agent states, dial by name, DCS call coverage, echo cancellation, multifrequency signaling, wideband switching, logged-in agents, offer category, maximum numbers of concurrently registered IP stations, administered IP trunks, ports, and concurrently administered remote office stations/trunks, call center release, features that have a product value (e.g., corresponding to a product name or type), a release number (e.g., referring to a product release identifier), and numeric value(s) (e.g., indicating an operational parameter associated with the product and/or release, such as how many ports are licensed, how many licenses for the product are granted, how many concurrent users are allowed, and/or how many stations can be concurrently administered with the feature).

42. The method of claim 33, wherein the servicing command is associated with at least one of the following user features: (a) features that are invoked prior to placing a call, (b) features that are invoked during a call, (c) features that are non-call associated that do not require display interactions, (d) features that are non-call associated that require display interactions, (e) features that are operated against calls not associated with the activating station, and (f) features that are operated against an alerting call.

43. The method of claim 42, wherein the servicing command is associated with at least one of the following user features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

44. The method of claim 33, wherein the session is defined by a point-to-point protocol, wherein a header and trailer of the session packets resemble the session type permitted by the firewall, and wherein the servicing commands and responses are embedded in session packet payloads in lieu of message content intended for a human recipient.

45. The method of claim 33, wherein the type of the session is not intended to be associated with a servicing command, wherein the session type does not enable packet numerical sequencing, and wherein the session packets are altered to numerically sequence the packets.

46. The method of claim 33, further comprising:
receiving the one or more packets associated with the session; and
forwarding the servicing command to the computational component requiring servicing.

47. The method of claim 45, wherein the servicing command is associated with at least one of maintenance, diagnosis, provisioning, administration, monitoring, operating, repair, replacement, (re)configuring, and servicing of the computational component and the session type is a computer telephony session.

48. A computer readable storage medium including computer executable instructions, that when executed, cause a computer to perform the steps of claim 33.

49. A logic circuit comprising circuitry operable to perform the steps of claim 33 and transform the servicing command into an operation by the computational component requiring servicing.

* * * * *